Patented July 17, 1951

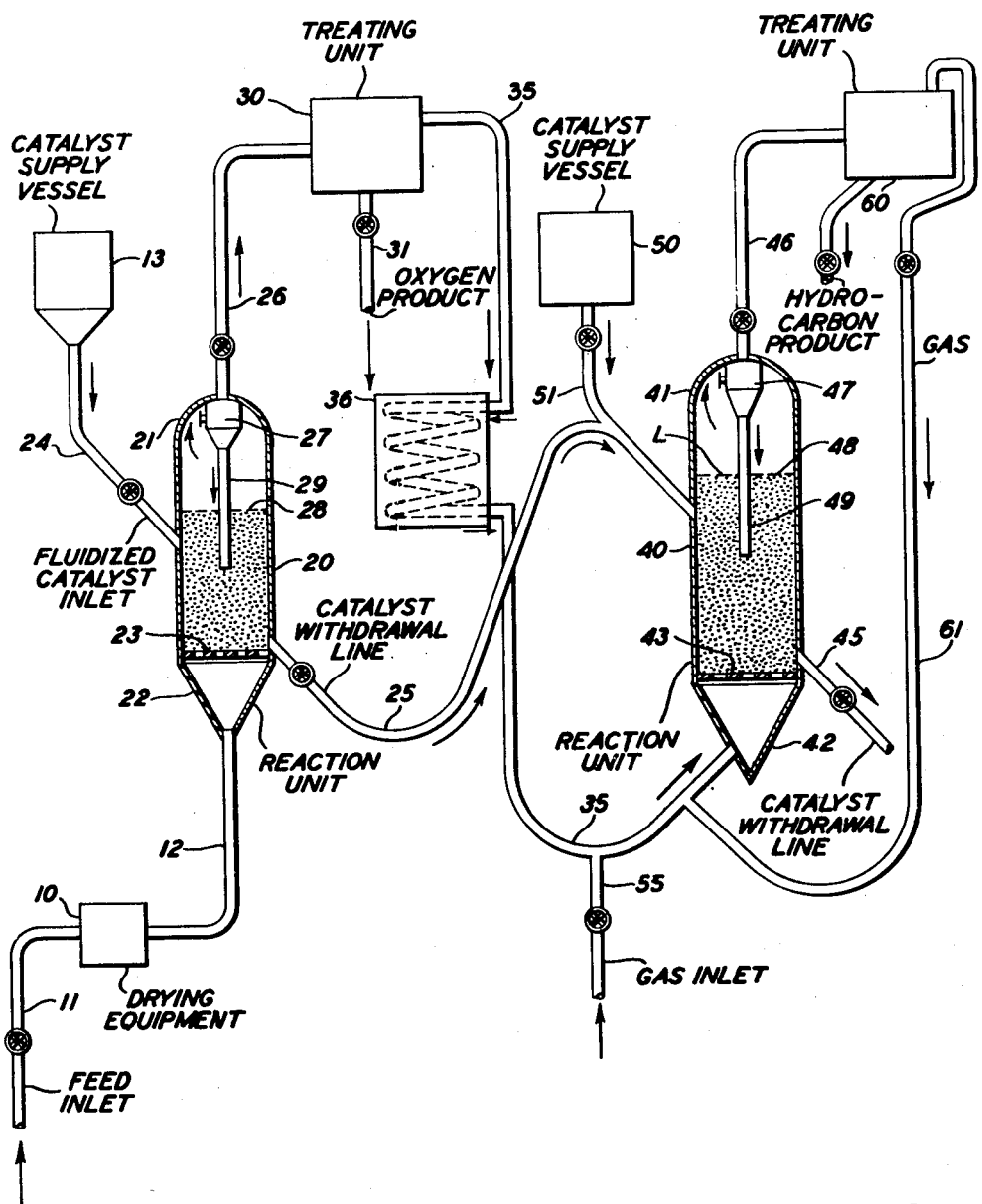

2,561,244

UNITED STATES PATENT OFFICE 2,561,244

HYDROGENATION OF OXIDES OF CARBON TO PRODUCE HIGH BOILING ALCOHOLS AND LIQUID HYDROCARBONS

Sumner B. Sweetser, Cranford, N. J., assignor to Standard Oil Development Company, a corporation of Delaware Application October 25, 1947, Serial No. 782,131

2 Claims. (Cl. 260—449.6)

This invention relates to the hydrogenation of the oxides of carbon and in particular to the hydrogenation of carbon monoxide to prepare hydrocarbons and high molecular weight alcohols.

For some time it has been known that by hydrogenating the oxides of carbon in the presence of catalysts, notably those containing a large proportion of iron, cobalt or nickel, and under elevated temperatures and superatmospheric pressures, hydrocarbons and oxygenated hydrocarbons can be obtained. Under the usual operating conditions for hydrocarbon synthesis the bulk of the product consists of liquid hydrocarbons associated with smaller amounts of gaseous and solid hydrocarbons. In addition an appreciable quantity of oxygenated compounds is produced. These oxygenated materials are comparatively low in molecular weight; ethyl alcohol, n-propanol and acetic acid being formed in largest amounts.

More recently, there has been devloped a modification of the hydrocarbon synthesis process whereby oxygenated compounds of relatively high molecular weight are produced as a comparatively large fraction of the total product. For example, alcohols with as many as 20 carbon atoms in the molecule are found in the products. Normal propyl alcohol is the lowest alcohol formed in any appreciable amount, methanol and ethanol being essentially absent. The alcohols are mostly of the primary type and in the range of $C_{10}$–$C_{17}$ find a large use in the manufacture of detergents.

The operating conditions used in this modified process for the production of long chain primary alcohols are very similar to those used in the conventional synthesis of hydrocarbons, the principal difference being in the use of lower temperatures. For hydrocarbon synthesis, temperatures in the range of 550–700° F. are generally employed whereas the production of long chain alcohols in large amounts requires a temperature of from 375 to 425° F. The lowest temperatures give the highest proportions of alcohols and the higher temperatures are used only as necessary to obtain the desired conversion. The same type of precipitated or fused iron catalysts may be used for the synthesis of the high molecular weight alcohols as for the synthesis of hydrocarbons. However, in order for the catalyst to exhibit good activity in the temperature range of 375 to 425° F. some precautions have to be taken in its preparation especially in the reduction stage. For example, the catalyst must be reduced for an extended period with a high circulation rate of hydrogen having a low water content. Also, care must be taken to prevent the reduced catalyst from coming in contact with oxygen prior to its use in the synthesis.

While it is possible to produce a high proportion of long chain primary alcohols by the process described above, it has certain limitations which require the use of multi-stage or recycle operation to maintain good yields of the desired alcohols. For example, it has been found that carbon dioxide and moisture which are produced in the reaction act slowly as poisons on the catalyst and reduce its activity so that higher temperatures are required to maintain the desired conversion. As indicated hereinbefore, this is undesirable in that increased temperatures tend to lower the proportion of long chain alcohols and to increase the proportion of olefins in the product. While the presence of carbon dioxide and moisture cannot be entirely eliminated from the reaction zone, the reaction can be conducted at low conversions per pass and the carbon dioxide and moisture as well as the desired products scrubbed out before the unreacted carbon monoxide and hydrogen are passed to a second stage or recycled to the same stage for further conversion. Conversion per pass is generally maintained at a sufficiently low level so that the carbon dioxide in the gas is maintained below a concentration of 10% at all times. While this procedure makes it possible to produce a high proportion of long chain primary alcohols, the scrubbing and recycling of large quantities of gas is an expensive operation.

In the present invention, hydrocarbons and oxygenated compounds of both high and low molecular weight are produced by the hydrogenation of carbon monoxide under conditions by which a high overall processing efficiency is obtained. The carbon monoxide-hydrogen mixture according to the invention is contacted with a catalyst at a space velocity and temperature to give relatively low conversion of the reactants whereby formation of long chain primary alcohols is favored. The reaction products are then cooled or treated with an adsorbent to remove the higher boiling alcohols and hydrocarbons. The thus treated reaction products without removal of carbon dioxide, vapor water, and low boiling reaction products are contacted with another catalyst mass under conventional hydrocarbon synthesis conditions. The advantage of such processing is that the carbon dioxide and water vapor produced in the first stage of the reaction while being detrimental to additional synthesis of primary alcohols do not interfere with, and may be somewhat beneficial, for processing under hydrocarbon synthesis conditions.

In general, processing according to the invention involves a gaseous mixture containing hydrogen and carbon monoxide in molecular ratio varying from about 2 to about 1 in the presence of a catalyst containing a major amount of iron, at a temperature of 350° to 450° F., a pressure from 15 to 30 atmospheres and space velocity from 1000 to 5000 v./v./hr. followed by treating the unreacted hydrogen and carbon monoxide and low boiling reaction products with a catalyst also consisting of a major amount of iron at a temperature from 550–700° F., a pressure from 15 to 30 atmospheres and a space velocity from 500 to 3000 v./v./hr. While such processing may be carried out in fixed bed operation, particularly advantageous processing may be effected under fluidized catalyst conditions.

Processing under fluidized catalyst conditions may be suitably effected with a hydrogen to carbon monoxide ratio of 1 to 1. Such a mixture is usually first dried and passed into a fluid catalyst reactor containing a conventional iron hydrocarbon synthesis catalyst in finely divided form. A suitable catalyst is one containing iron promoted with 3.5% alumina and 0.5% of potassium oxide. Careful reduction with a large volume of dried hydrogen is a necessary step in the catalyst preparation. With fluidized catalyst of such a type, the pressure may vary from 15 to 30 atmospheres, the temperature from 375°–435° F. and the space velocity from 1000 to 5000 v./v./hr. Under such reaction conditions, the conversion of carbon monoxide and hydrogen mixture varies from about 10 to 50% by volume. The reaction is made to proceed at conversions below 50% in order to maintain high selectivity to alcohols. Another advantage to be gained by the use of low conversion when employing the fluid technique is that the concentration of high boiling products is maintained at a sufficiently low level that appreciable condensation of such products on the catalyst is avoided and fluidization of the catalyst is not impaired. The conversion may be adjusted by regulating temperature or space velocity but it is desirable to keep the temperature as low as possible to maintain high selectivity to alcohols.

The high boiling reaction products are separated from the unreacted hydrogen and carbon monoxide and low boiling reaction products by condensation or adsorption on activated charcoal or silica gel. Since the products from this stage of the synthesis contain no appreciable amounts of alcohols lower than normal propyl alcohol, it is desirable to use separating conditions which are adequate to remove most of this constituent without attempting to separate lower boiling products. In such processing, the pressure upon the gas may or may not be released and the temperature need be lowered only to the point where the $C_3$ and higher oxygenated compounds are removed. When adsorption is used, the adsorbent may be used in fixed bed, or fluidized condition with continuous regeneration.

The gas from which the oxygenated compounds have been removed is passed through a booster, if necessary, and then to a second fluid catalyst reactor containing an iron hydrocarbon synthesis catalyst. In addition to having processing advantages the use of somewhat higher pressure in the first stage eliminates the necessity of using a booster between stages. The catalyst may be the same as used in the first stage if it is desired to produce additional oxygenated compounds, particularly in the lower molecular weight range. The following conditions may be used in the hydrocarbon synthesis reactor:

Pressure_____15–30 atmo.
Temperature_____550–700° F.
Space Velocity_____500–3000 v./v./hr.

Sufficient recycle of the exit gas may be used to effect the desired conversion. In this stage, it is desirable to obtain high conversion, for example, at least 90% of the carbon monoxide and hydrogen to bring about efficient utilization of the feed. However, it is unnecessary to scrub the carbon dioxide and water vapor from the recycle stream. In general, the hydrocarbon synthesis reactor in the second stage will be larger than the alcohol synthesis reactor in the first stage.

The process of the invention may be further understood by the following description and attached drawing in which a flow diagram is presented of advantageous processing according to the invention.

A mixture of hydrogen and carbon monoxide in about equal molecular proportions is passed through line 11 into drying equipment 10 and thence through line 12 into the lower portion of reaction unit 20. The reaction unit 20 consists in this particular embodiment of a cylindrical vessel capped by a dome 21 and a conical base 22. Within the reaction vessel above the cone shaped portion is a grid 23. The unit 20 is fitted with a fluidized catalyst entrance line 24 and a catalyst side withdrawal line 25 and an overhead line 26. In the dome portion of the unit is fitted one or more cyclone separating units as indicated by the single unit 27.

Into the unit 20 from catalyst supply vessel 13, the fluidized catalyst in finely divided form is passed into the reaction chamber 20 through line 24. In this particular illustration, the catalyst is a composition of 96% iron, 3.5% alumina, and 0.5% $K_2O$. As supplied through line 24, the catalyst is in a fluidized condition. An oxygen-free fluidizing gas may be added to line 24 to facilitate the flow of catalyst therethrough. This finely divided catalyst is fluidized in a mixture of hydrogen and carbon monoxide similar to that supplied to the unit 20 through line 12. The fluidized mass admitted through line 24 has a density of about 25–75 lbs. per cubic ft. In the reaction unit 20, fluidized conditions are maintained by the passing of the gases through line 12 into the lower portion of the unit and the distribution of the gases through the grid 23. The superficial velocity of the gases passing upwards through the unit is usually about ½–3 ft. per second and in this embodiment, about 1 ft. per second. Within the unit 20 the fluidized mass resembles a boiling liquid but has a general level of about ⅔ of the height of the vessel above the grid as indicated in the drawing by the reference number 28. Throughout the reaction unit, a pressure of about 25 atmospheres and a temperature of 375°–400° F. are maintained, the exact temperature depending on the activity of the catalyst. The space velocity is maintained at about 2000 v./v./hr. The heat generated by the reaction may be absorbed by installing cooling tubes in the reactor or by suitable jacketing of the reaction vessel. Under the conditions of processing as given, a predominantly gaseous phase with a small amount of entrained catalyst passes upwards into the dome portion of the reaction unit and through the cyclone separators as indicated by the reference numeral 27. The solid catalyst material separated by the cyclone separators is returned to the dense fluidized mass through the pipe 29. The gases and vapors separated in the cyclones pass overhead through line 26 to a treating unit 30.

The reaction products together with the unreacted feed passing through line 26 are treated in unit 30. In passing into the unit 30, no reduction of pressure usually occurs. The unit 30 may consist of condensing equipment or contain adsorptive solids depending upon the type of reaction products to be removed. In the case of the desired removal of alcohols of the $C_3$ and higher range, equipment 30 consists merely of a series of condensers by which the $C_3$ and higher alcohols together with hydrocarbons in the same boiling range are condensed and separated from the unreacted gases and lower boiling reaction products. It is, however, within the purview of the invention that treating equipment 30 may contain activated charcoal or silica gel. On such adsorptive solids, the oxygenated compounds are readily separated from the gaseous and low molecular weight volatile products and to a considerable extent from hydrocarbons of the same boiling range.

From the treating unit 30, the unreacted gases and hydrocarbon reaction products are removed through line 35, then forced through heater 36 and passed into the lower portion of the reaction unit 40 similar in construction to that of unit 20 but with a capacity somewhat larger. The oxygenated compounds mixed with some liquid hydrocarbons are removed from the treating unit 30 through line 31 for subsequent treatment as desired for recovery of the oxygenated compounds. The unit 40 consists of a dome section 41 and a conical section 42 and a grid 43, a catalyst withdrawal line 45, a catalyst supply line 51, an overhead line 46, cyclone separator 47 and a catalyst return line 49.

Fluidized operation is maintained in the unit 40 by reason of the injection of the gases through the bottom of the vessel upwards through the grid 43. The temperature maintained throughout the unit is 600° F. and a pressure of about 25 atmospheres. The space velocity is about 1000 v./v./hr. and the superficial velocity of the gas is between ½ to 2 ft. per second and preferably about 1 ft. per second. As a result of the processing conditions the mass within the unit 40 has the apperance of a boiling liquid which has the general level as indicated by the reference number 48.

The catalyst supplied the unit 40 may be the catalyst removed from the vessel 20 through line 25. On the other hand, fresh catalyst may be added if desired from the vessel 50 through line 51. In general, it is not necessary to add catalyst continuously to either reaction zone, as the life of these catalyst materials is usually 1 to 6 months or more. Since the increase in temperature which can be tolerated in the alcohol synthesis stage is small because of the adverse effect on selectivity to alcohol formation, it is desirable in most cases to add the fresh catalyst to the alcohol synthesis stage at a sufficient rate to maintain the desired conversion at a temperature between 375 and 400° F. The catalyst withdrawn from the unit 20 may be transferred directly to the hydrocarbon synthesis unit 40. The used catalyst from the alcohol synthesis stage possesses adequate activity for prolonged use in the hydrocarbon synthesis stage at the higher temperatures employed therein. In addition to the gas supplied through line 35 into the unit 40, additional synthesis gas may be added through line 55 as particularly desired for the processing to be carried out in the unit 40.

The heat liberated from the reaction in vessel 40 is absorbed by installing cooling tubes within the dense phase of catalyst or by suitably jacketing the reaction vessel. Passing upwards from the dense phase, volatile constituents containing entrained catalyst are passed through the cyclone 47. The solid catalyst is returned to the fluidized mass through line 49 while the vapor is passed through the unit through line 46 to hydrocarbon recovery unit 60 for processing as desired for recovery of desired reaction products. Also from the treating unit 60, unreacted gases and low molecular weight reaction products may be recycled through line 61 into line 35.

In processing the carbon monoxide-hydrogen feed according to this invention a number of advantages are obtained. It is possible to obtain good yields of long chain primary alcohols with efficient utilization of the total feed and without the necessity of scrubbing large quantities of process gas for the removal of carbon dioxide and water vapor. By operating at low conversion in the alcohol synthesis stage, it is possible to employ the fluid catalyst technique without excessive condensation of product on the catalyst. The spent catalyst from the alcohol synthesis stage is utilized to advantage in the hydrocarbon synthesis stage. The recovery of the alcohols from the first stage is simplified by operating the condensing or adsorption equipment at condtions which separate the alcohols but allow a large part of the hydrocarbons to pass through to the hydrocarbon synthesis reactor and recovery equipment. Considerable flexibility in the proportion of alcohols to hydrocarbons produced is possible by regulating the space velocity and hence the conversion in the alcohol synthesis stage or by by-passing part of the fresh feed around the alcohol synthesis stage.

What is claimed is:

1. A process for producing normally liquid hydrocarbons and higher boiling alcohols which consists essentially in reacting a dried mixture of hydrogen and carbon monoxide in a reaction zone in the presence of a fluidized mass of reduced powdered iron catalyst containing a promotional amount of an activating substance, which catalyst has been formed by reducing iron oxide with hydrogen of low water content for an extended period of time and which catalyst has been excluded from contact with oxygen, maintaining a temperature of from about 375°–425° F. and a pressure of from about 15–30 atmospheres in said reaction zone and forcing the reactants through the fluidized catalyst at a rate of from about 1,000–5,000 volumes of reactants per volume of catalyst per hour, limiting the conversion of carbon monoxide per pass through the reaction zone at from about above 10% but below 50% by observing the foregoing conditions whereby substantial quantities of $C_{10}$–$C_{17}$ alcohols are formed, withdrawing a crude product in vapor form from the reaction zone, separating $C_{10}$–$C_{17}$ alcohols from said crude product, passing the remainder of the crude product containing $CO_2$, $H_2O$, CO and $H_2$ to a second reaction zone where they are contacted with a second powdered iron catalyst in a form of a fluidized mass, maintaining a temperature of from about 550°–700° F. and a pressure between about 15 and 30 atmospheres in said reaction zone and feeding the vapors to said second reaction zone at a space velocity of from about 500–3,000 volumes of vapors per volume of catalyst per hour, and recovering from said second reaction zone a product containing substantial amounts of normally liquid hydrocarbons.

2. The method set forth in claim 1 in which the catalyst used in both reaction zones is iron promoted with 3.5 weight per cent alumina and a potassium compound amounting to 0.5 weight per cent expressed as potassium oxide.

SUMNER B. SWEETSER.

REFERENCES CITED

The following references are of record in the file of this patent:

UNITED STATES PATENTS

| Number | Name | Date |
|---|---|---|
| 1,909,442 | Williams | May 16, 1933 |
| 1,963,119 | Dreyfus | June 19, 1934 |
| 1,996,101 | Dreyfus | Apr. 2, 1935 |
| 2,149,515 | Fisher | Mar. 7, 1939 |
| 2,183,146 | Michael | Dec. 12, 1939 |
| 2,257,293 | Dreyfus | Sept. 30, 1941 |
| 2,257,457 | Fisher | Sept. 30, 1941 |
| 2,417,164 | Huber, Jr. | Mar. 11, 1947 |
| 2,434,537 | Barr et al. | Jan. 13, 1948 |
| 2,451,879 | Scharmann | Oct. 19, 1948 |